United States Patent [19]

Nothdurft

[11] 4,103,843
[45] Aug. 1, 1978

[54] FISHING REEL

[76] Inventor: Carl Nothdurft, 22,412 LaVon, St Clair Shores, Mich. 48081

[21] Appl. No.: 671,570

[22] Filed: Mar. 29, 1976

[51] Int. Cl.² .................. B65H 75/48; A01K 89/017
[52] U.S. Cl. ................................ 242/107; 242/84.3; 242/106
[58] Field of Search ............... 242/84.3, 107 R, 107.5, 242/84.1 R, 106

[56] References Cited

U.S. PATENT DOCUMENTS

| | | | |
|---|---|---|---|
| 1,560,919 | 11/1925 | Unruh | 242/84.3 |
| 1,914,471 | 6/1933 | White | 242/84.3 |
| 2,013,733 | 9/1935 | Murphy | 242/107 R X |
| 2,505,920 | 5/1950 | Sporket | 242/107 R X |
| 2,672,217 | 3/1954 | Sarah | 242/84.3 X |
| 3,054,573 | 9/1962 | Spencer | 242/107.5 |
| 3,547,371 | 12/1970 | Gruseck | 242/106 |
| 3,951,354 | 4/1976 | Bagby | 242/106 X |

Primary Examiner—Billy S. Taylor
Attorney, Agent, or Firm—William L. Fisher

[57] ABSTRACT

Improvement in a fishing reel having a spool upon which a fishing line is wound, a cover for the spool, a coil spring for automatically winding up the fishing line upon release thereof, a spring cover for winding up the spring, a gear train for rotating the spool upon unwinding of the spring, the improvement comprising the cover consisting of two spool covers held together with a first set of fasteners disposed radially outwardly of the spool, the spring cover carried on one of the spool covers, an axle extending between the spring cover and the other of the spool covers, the gear train including a compound gear and a driver gear and a pinion gear, the driver gear and the pinion gear rotatably supported on the axle, a second set of fasteners carried on the one spool cover for fastening the spring cover thereon, bosses formed in the one spool cover for threadably carrying the second set of fasteners, a tongue and groove arrangement between the spring cover and the one spool cover disposed inwardly of the second set of fasteners, the spring cover, when loosened during winding of the spring, being held in place and located by the second set of fasteners, by the tongue and groove arrangement and by the axle, the end of the axle disposed in the spring cover serving as a rotation axis for the latter during winding up of the spring, the inner end of the spring held in a slot in the driver gear, an arrangement for fastening the fishing line to the spool consisting of an aperture in the spool, a larger aperture in the other spool cover so that the inner end of the fishing line can be threaded through the reel and knotted to hold it against the outside of the spool, and a line guide arrangement for guiding the movement of the fishing line, the line guide arrangement comprising a line guide member and a tubular spacer carried on one of the fasteners of the first set of fasteners, the line guide arrangement serving as a closed loop line guide opening for said fishing line immediately adjacent the spool.

1 Claim, 8 Drawing Figures

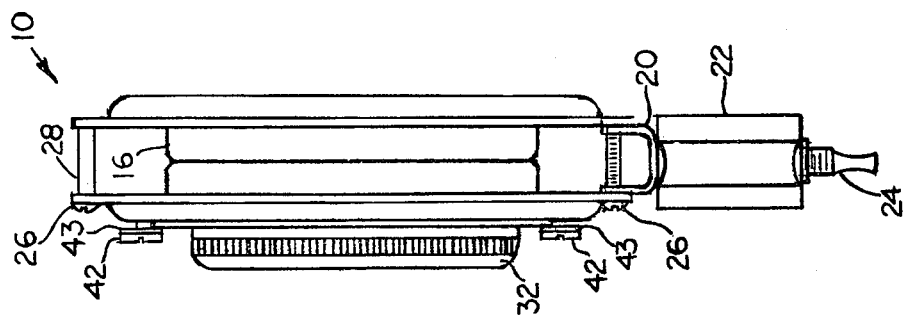
FIG_3
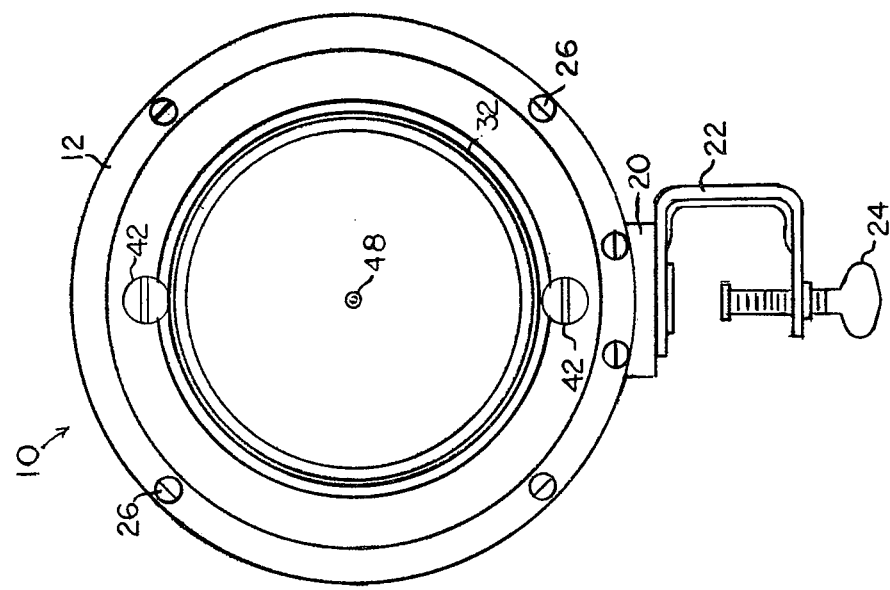
FIG_1
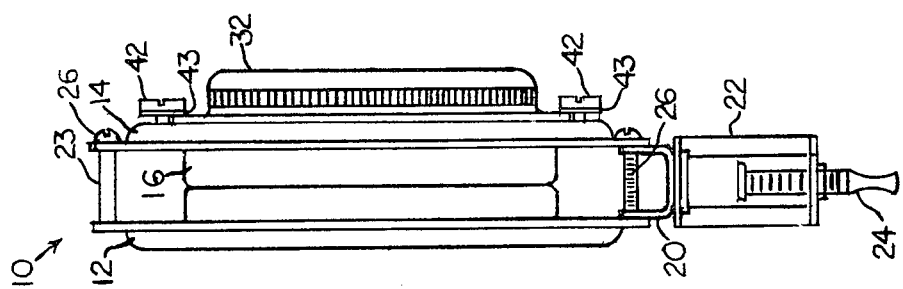
FIG_4

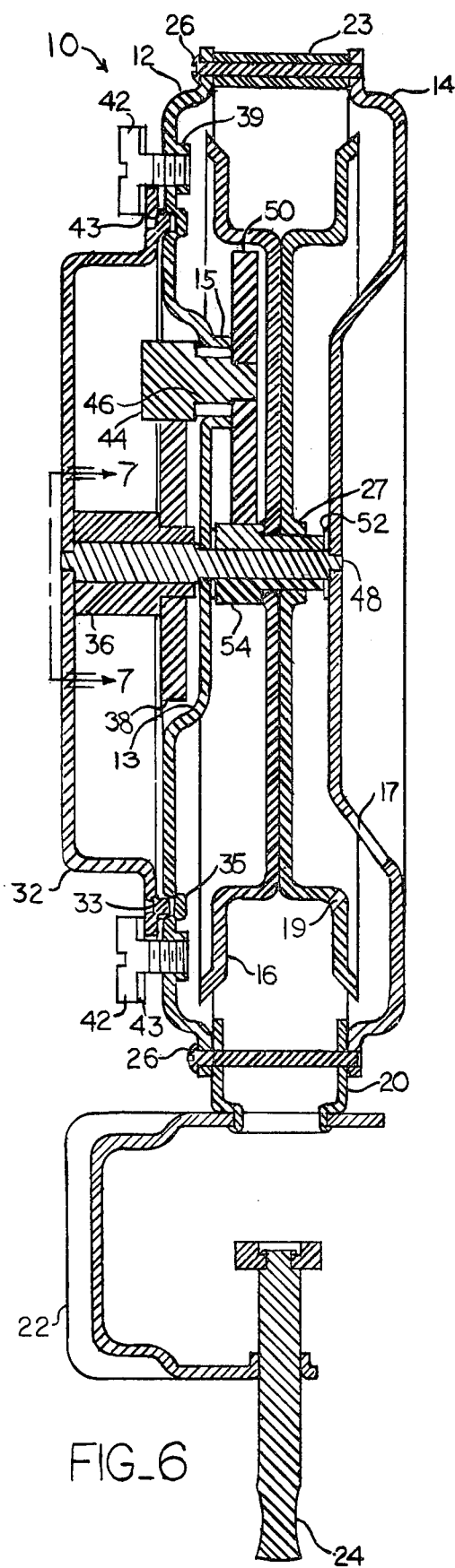
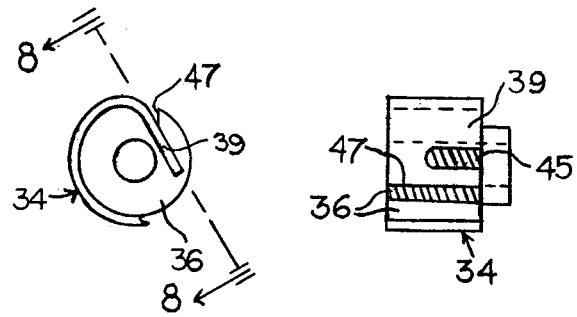
FIG_7   FIG_8
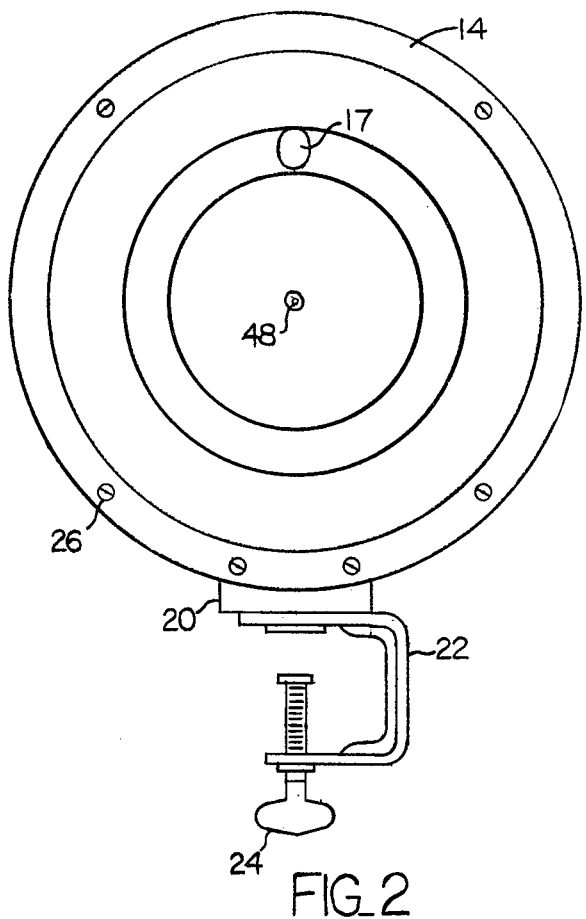
FIG_6   FIG_2

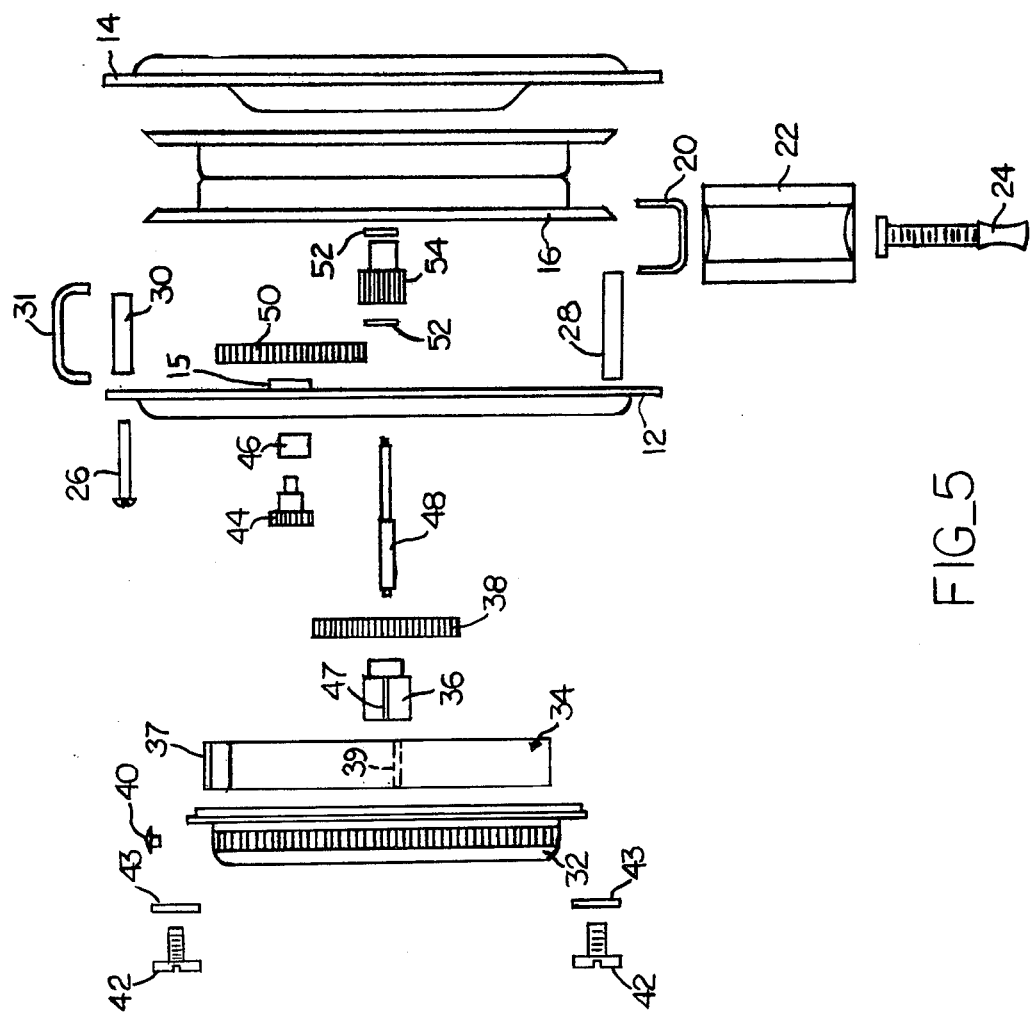
FIG_5

FISHING REEL

My invention relates to fishing.

The principal object of my invention is the provision of improvements in fishing reels which, inter alia, impart greater utility thereto.

The foregoing object of my invention and its advantages will become apparent during the course of the following description, taken in conjunction with the accompanying drawings, in which:

FIGS. 1 and 2 are front and rear elevational views, respectively, of a fishing reel embodying my invention;

FIGS. 3 and 4 are opposite end elevational views of said embodiment;

FIGS. 5 and 6 are, respectively, exploded and vertical sectional views of said embodiment;

FIG. 7 is a fragmentary end elevational view with parts removed of the structure of FIG. 6 taken on the line 7—7 thereof; and FIG. 8 is a sectional view of the structure of FIG. 7 taken on the line 8—8 thereof.

Referring to the drawings in greater detail, 10 generally designates said embodiment which comprises a spool 16 supported for rotation inside opposing covers 12 and 14. Said covers 12 and 14 are held together in spaced-apart relationship to each other by a plurality of screws 26 and tubular spacers 28 and 30 and by a portion 20 of a bracket assembly 22. Said bracket assembly 22 includes a lower portion in the form of a C-clamp and thumb screw 24 swivelable on the portion 20. Said lower portion is used for clamping the fishing reel 10 on suitable stationary structure such as part of a boat. The cover 12 carries a spring housing 32 which houses a flat coil spring 34 (FIG. 5) and is manually rotatable on the cover 12 as will be described. An axle 48 which is shouldered near its midpoint and at its ends is supported in central apertures in the spring housing 32 and in the cover 14. The axle 48 bears against the cover 12 via its inner shoulder and rotatably supports both a driver or spur gear 38 and a pinion gear 54. The driver gear 38 is provided with a hub 36 by which it is made fast, as by press-fitting. Said driver gear 38 is disposed in a gear cavity 13 formed in said cover 12. Said gear cavity 13 is provided with an apertured boss 15 in which is press-fitted a bearing 46 rotatably carrying a pinion gear 44 which meshes with said spur gear 38. Said pinion gear 44 has a hub by which it is made fast, as by press-fitting, to a larger spur gear 50 which meshes with said pinion gear 54. The pinion gear 54 has a hub by which it is made fast to the spool 16 by splining provided both on said hub and in an aperture in a central boss 27 formed in said spool 16. A pair of washers 52 space the pinion gear 54 from the covers 12 and 14 and take up thrust from the rotating spool 16. The hub 36 and spur gear 38 may be molded of plastic in one piece. The pinion gear 44 and the spur gear 50 have to be made in separate pieces but each can be molded of plastic. Likewise the pinion gear 54 can be molded of plastic. In this event, the hub of the pinion gears 46 and 54 and the apertures in the spur gear 50 and in the boss 27 may be formed of square or hexagonal cross-sections to more positively prevent relative rotation of these parts. The covers 12 and 14, the spring housing 32 and the spool 16 may likewise be molded of plastic. The spring housing 32 has a cylindrical surface which is knurled on the outside thereof, as shown, to assist in manually rotating it. Said spring housing 32 is flanged about its circular periphery against which a pair of flat headed screws 42 press to hold the spring housing 32 on the cover 12. Said screws 42 are threadably engaged in bosses 39. Said flange is provided with a circular tongue 33 which engages in a circular groove 35 formed in the cover 12. When the screws 42 are loosened the spring housing 32 may be manually rotated while the heads of said screws 42 bear against said flange to hold the tongue 33 in the groove 35. In this way the spring housing 32 does not have to be manually held in place on the cover 12 while it is being manually rotated. In other words, the task of winding the spring 34 is facilitated in that the holding of the spring housing 32 is place on the cover 12 is accomplished mechanically while only the rotation thereof must be carried out manually. When the screws 42 are tightened, the spring housing 32 is made fast to the cover 12. Washers 43 are made fast to the heads of the screws 42 for assisting in the grip of said screws 42 upon the flange of the spring housing 32. For convenience of illustration the coil spring 34 is not shown in FIG. 6 but rather in FIG. 5 where its attachment to the spring housing 32 is illustrated, i.e. the outer end 37 of the coil spring 44 is made fast, as by a rivet 40 (FIG. 5), to the inside surface of the cylindrical wall of the spring housing 32. The inner end 39 of said spring 34 is made fast to the hub 36, as by a groove 47 (FIG. 5) therein. Said groove 47 is arranged in the hub 36 to conform as much as possible to the curvature of said spring 34 so that the inner end 39 need be bent as little as possible, i.e. at greater than an acute angle in respect to the curvature thereof, to minimize breakage of said inner end 39. Said groove 47 is not a through groove or slot in that a portion 45 of the body of said hub 36 is not cut out as shown. Said portion 45 serves as a lock for the inner end 39 of the coil spring 34 which has a correspondingly shaped slot therein to receive and accommodate said portion 45. In this way the connection between said coil spring 34 and hub 36 is made far more firm and secure since the inner end 39 is locked in the groove 47. The purpose of supporting the spring housing 32 for manual rotation on the cover 12 is to wind up the spring 34 after a fishing line is wound upon the spool 16. The inner end of the fishing line is threaded first through a line guide 31 (FIG. 5), an aperture 19 in the spool 16 and then through an aperture 17 in the cover 14. The free end of said inner end is knotted or otherwise bulked up on the outside of the cover 14 so that it cannot again pass through the aperture 19. By this knotting or bulking up of the inner end of the fishing line on the outside of the cover 14, said fishing line is thus made fast to the fishing reel 10. It should be mentioned that the line guide 31 (FIG. 5) is swivelably carried, via its apertured ends, on one of the screws 26 which also carries a tubular spacer 30. The spacer 30 is slightly shorter in length than the other spacers 28 so that it fits between the ends of the line guide 31. The line guide 31 guides the fishing line as it winds upon or is payed out from said spool 16. After the fishing line is fully wound upon the spool 16 the latter is manually held fast against rotation while the spring housing 32 is rotated until the spring 34 is fully wound, whereupon the screws 42 are tightened to hold the spring housing 32 in place on the cover 12. In this way whenever the fishing line is payed out from the spool 16 and then let loose it will be automatically wound upon the spool 16. The operation of the fishing reel 10 in winding up or paying out the fishing line can be seen to be dependent upon the motive force of the spring 34 in winding up or unwinding, respectively.

Said spring 34, which is very powerful since it is a flat coil spring of ample size, controls the rotation of the hub 36 and spur gear 38 which causes the pinion gear 44 and spur gear 50 to rotate at a faster speed which in turn causes the pinion gear 54 and spool 16 to rotate at a still faster speed. I have found that a gear ratio of about 4:1 works very well for each of the two sets of gears so that the spool 16 rotates approximately 16 times as fast as the driver gear 38. This is very desirable from the standpoint of the speed with which the fishing line winds upon the spool 16. For trolling or dock fishing in rivers having a strong current a heavy lead sinker is attached to the free end of the main fishing line and a plurality of leader fishing lines are then attached to said main fishing line near said lead sinker. In trolling, for example, the user of the fishing reel 10 manually pays out the main fishing line and holds on to the same while the boat is moving. Whenever he lets go of the main fishing line, as when a fish bites, it will be automatically and rapidly wound upon the spool 16. The force of winding of the fishing line on the spool 16 by the action of the spring 34 is more than ample to pull in any fish which bites on a leader fishing line attached to the main fishing line.

It will thus be seen that there has been provided by my invention an improved fishing reel in which the object hereinabove set forth, together with many thoroughly practical advantages, has been successfully achieved. While a preferred embodiment of my invention has been shown and described, it is to be understood that variations and changes may be resorted to without departing from the spirit of my invention as defined by the appended claims.

What is claimed is:

1. Improvement in a fishing reel having a spool upon which a fishing line is wound, cover means for said spool, a coil spring for automatically winding up the fishing line upon release thereof, a spring cover for winding up the spring, a gear train for rotating the spool upon unwinding of the spring, said improvement comprising said cover means including two spool covers held together with a first set of fasteners disposed radially outwardly of said spool, said spring cover carried on one of said spool covers, an axle extending between said spring cover and the other of said spool covers, said gear train including a compound gear and a driver gear and a pinion gear, said driver gear and said pinion gear rotatably supported on said axle, said driver gear including a hub made fast therewith, a second set of fasteners carried on said one spool cover for fastening the spring cover thereon, bosses formed in said one spool cover for threadably carrying said second set of fasteners, tongue and groove means between the spring cover and said one spool cover disposed inwardly of said second set of fasteners, said spring cover, when loosened during winding of the spring, being held in place and located by the second set of fasteners, by said tongue and groove means, and by said axle, the axle having an end disposed in said spring cover serving as a rotation axis for the latter during winding up of said spring, the inner end of said spring held in a slot in said driver gear hub, means for fastening the fishing line to said spool consisting of an aperture in said spool, a larger aperture in said other spool cover so that the inner end of said fishing line can be threaded through said reel and knotted to hold it against the outside of said spool, and a line guide means for guiding the movement of the fishing line, said line guide means comprising a line guide member and a tubular spacer carried on one of the fasteners of said first set of fasteners, said line guide means serving as a closed loop line guide opening for said fishing line immediately adjacent the spool.

* * * * *